United States Patent [19]

Hecker

[11] Patent Number: 5,423,068
[45] Date of Patent: Jun. 6, 1995

[54] METHOD OF MANAGING, IN A TELECOMMUNICATION NETWORK, USER DATA OF A USER WHO MAY MOVE FROM A BASE WORK AREA ASSOCIATED WITH A BASE EXCHANGE TO ANOTHER WORK AREA ASSOCIATED WITH ANOTHER EXCHANGE

[75] Inventor: Hubertus P. J. Hecker, Voorburg, Netherlands

[73] Assignee: Koninklijke PTT Nederland N.V., Groningen, Netherlands

[21] Appl. No.: 73,792

[22] Filed: Jun. 8, 1993

[30] Foreign Application Priority Data

Jun. 19, 1992 [NL] Netherlands ............... 9201090

[51] Int. Cl.⁶ ............................................. H04B 7/00
[52] U.S. Cl. ................... 455/56.1; 455/33.2; 379/60
[58] Field of Search ............. 455/33.1, 33.2, 54.1, 455/56.1; 379/59, 60, 63

[56] References Cited

U.S. PATENT DOCUMENTS

| | | | |
|---|---|---|---|
| 4,775,999 | 10/1988 | Williams | 455/33.2 X |
| 5,101,501 | 3/1992 | Gilhousen et al. | 455/56.1 X |
| 5,127,100 | 6/1992 | D'Amico et al. | 455/33.1 |
| 5,189,734 | 2/1993 | Bailey et al. | 455/33.2 |

OTHER PUBLICATIONS

Rueppel et al, "Feind hört mit", Jan. 1992. pp. 46–49, Technische Rundschau.
Fuhrmann, "Intelligente Vermittlungsfunktionen für Mobilkommunikationsnetze–Teil 2", May 1990, pp. 380–385, NTZ Nachrichten Technische Zeitschrift, No. 5.
Ballard et al, "Cellular Mobile Radio as an Intelligent Network Application", 1989, pp. 389–399, Electrical Communication, No. 4.
ETSI/GSM Technical Specification, GSM 03.03, version 3.5.0, Jan., 1991, European Digital Cellular Telecommunication System (phase 1; Numbering, Addressing and Identification), European Telecommunications Standards Institute, France, 1992.
ETSI/GMS Technical Specification, GSM 03.08, version 3.7.0, Jan., 1991, European Digital Cellular Telecommunication System (phase 1; Organization of Subscriber Data), European Telecommunications Standards Institute, France, 1992.
ETSI/TC GSM, GSM 11.30, Mobile Services Switching Centre, Apr. 9, 1990.
ETSI/GSM, GSM 11.31, Home Location Register Specification, version 3.2.1, Apr. 10, 1990.
ETSI/GSM, GSM 11.32, Visitor Location Register Specification, version 3.2.1. Apr. 10, 1990.

Primary Examiner—Edward F. Urban
Attorney, Agent, or Firm—Frishauf, Holtz, Goodman & Woodward

[57] ABSTRACT

A method of managing, in a telecommunication network, user data of a user who may move from a base work area associated with a base exchange which comprises a base memory to another work area associated with another exchange which comprises another memory, independent of whether or not the user is communicating. The method comprises effecting a coupling between the base memory and the another memory when the user moves from the base work area to the another work area; copying a largest portion of the user data stored in the base memory and storing the copied data in the another memory via the coupling, the user data stored in the base memory remaining available for further copying, and changes to be made in the user data taking place both in the base memory and in the another memory. The copied portion of the user data stored in the another memory is inspected for correctness with respect to the user data stored in the base memory and, in the event of correctness of the copied portion of the user data, the portion of the user data stored in the another memory is made available for further copying. Changes to be made in the data take place only in the another memory, and the copied portion of the user data stored in the base memory thereafter becomes unavailable for further copying.

16 Claims, 1 Drawing Sheet

METHOD OF MANAGING, IN A TELECOMMUNICATION NETWORK, USER DATA OF A USER WHO MAY MOVE FROM A BASE WORK AREA ASSOCIATED WITH A BASE EXCHANGE TO ANOTHER WORK AREA ASSOCIATED WITH ANOTHER EXCHANGE

BACKGROUND OF THE INVENTION

The invention relates to a method of managing, in a telecommunication network, user data of a user who may move from a base work area associated with a base exchange which comprises base memory means to another work area associated with another exchange which comprises other memory means.

A method of this type is disclosed in various GSM (Group Spéciale Mobile) recommendations, such as GSM 03.03, 03.08, 11.30, 11.31 and 11.32. According to the method described therein, the base memory means associated with the base exchange (Home Location Register or HLR) comprise all the data of the user who, normally speaking, is located in the base work area associated with the base exchange. If the user moves to the other work area associated with the other exchange, only those data which are required for handling calls and for other purposes (which are of importance for the user temporarily located in said other work area) are copied out of the base memory means (HLR) into the other memory means associated with the other exchange (Visitor Location Register or VLR). Under these circumstances, the base memory means (HLR) function as "master" memory means and the other memory means (VLR) function as "slave" memory means, some user data thus being present in two different memories while the user is located in the work area associated with the other exchange. If the user moves to a further work area associated with a further exchange, again only those data which are required for handling calls and for other purposes (which are of importance for the user temporarily located in the said further work area) are copied from the base memory means (HLR) into the further memory means (VLR) associated with the further exchange, the base memory means (HLR) again functioning as "master" memory means and the further memory means (VLR) functioning as "slave" memory means. The base memory means (HLR) therefore always function as "master" memory means, while all the other memory means (VLRs) always function as "slave" memory means, at least as regards this user.

A known method of this type has the disadvantage that some user data are present in two different memories while the user is located in another work area associated with an exchange other than the base exchange, which takes up memory capacity and consequently reduces the efficiency of the method, and that, if the user continues to move to successive work areas, the data required have to be copied over ever greater distances from the base memory means (HLR) to succeeding memory means (VLRs), which reduces both the reliability and the efficiency of the method.

SUMMARY OF THE INVENTION

The object of the invention is, inter alia, to provide a more efficient and more reliable method.

For this purpose, the method according to the invention has the characteristic that, if the user moves from the base work area to the other work area, a coupling is effected between the base memory and the other memory, a largest portion of the user data stored in the base memory being copied and stored via the coupling in the other memory and the user data stored in the base memory being definitive (i.e., being available for copying) for the user and changes to be made in the user data taking place both in the base memory and in the other memory, the portion of the user data copied into the other memory then being inspected for correctness with respect to the user data stored in the base memory, whereafter, in the event of correctness, the portion of the user data stored in the other memory becomes definitive for the user (i.e., becomes available for further copying) and changes to be made in the data take place only in the other memory means, the copied portion of the user data stored in the base memory becoming negligible (i.e., becoming unavailable for further copying).

The method according to the invention rejects the constant functioning of the base memory as "master" memory and the constant functioning of the other memory as "slave" memory means as regards a particular user. Because the largest portion of the user data stored in the base memory is copied and stored in the other memory, the copied portion of the user data stored in the other memory is then inspected for correctness with respect to the user data stored in the base memory, the portion of the user data stored in the other memory becomes definitive (available for copying) for the user after correctness has been confirmed and the copied portion of the user data stored in the base memory thereafter becomes negligible and consequently overwriteable, the memory capacity required (unavailable for copying) for said user data in the base memory is saved, which increases the efficiency of the method according to the invention. If the user then moves to a succeeding work area associated with a succeeding exchange which comprises a succeeding memory, the largest portion of the user data stored in the other memory is copied and stored in the succeeding memory. The copied portion of the user data stored in the succeeding memory is subsequently inspected for correctness with respect to the user data stored in the other memory, the portion of the user data stored in the succeeding memory becomes definitive (available for copying) for the user after correctness has been confirmed and the copied portion of the user data stored in the other memory then becomes negligible(unavailable for copying), as a result of which the required data are no longer copied over the generally large distance between the base memory and the succeeding memory but over the generally smaller distance between the other memory and the succeeding memory which increases both the reliability and the efficiency of the method according to the invention compared with the known method.

The present invention is based on the insight that the storing of the same data in two different memories is inefficient and that the reliability and the efficiency of a method is increased if the data are copied over a smaller distance, which is achieved by storing data in a memory situated as near to the user as possible.

A first embodiment of the method according to the invention has the characteristic that, in the event of incorrectness of the copied portion of the user data stored in the other memory with respect to the user data stored in the base memory, the largest portion of the user data stored in the base memory is copied once more and is stored via the coupling in the other memory.

This increases the reliability of the method further.

A second embodiment of the method according to the invention has the characteristic that user data not belonging to the largest portion and stored in the base memory comprises information relating to a location of the other exchange.

As a result of storing the location of the other exchange in the uncopied portion of the user data in the base memory, where the user is located is permanently known in the base exchange, which promotes the reliability.

A third embodiment of the method according to the invention has the characteristic that the user data not belonging to the largest portion and stored in the base memory comprises information relating to a protection of the user.

As a result of storing information relating to the protection of the user in the uncopied portion of the user data in the base memory, this information is permanently available at one point and it is not copied and transmitted to another memory, which promotes the protection of the user and consequently the reliability.

A fourth embodiment of the method according to the invention has the characteristic that user data not belonging to the copied portion and stored in the other memory comprises information relating to this other exchange.

As a result of storing the information relating to the other exchange in the uncopied portion of the user data in the other memory, this information is available only at that point where the information is necessary and the base memory and succeeding memory are not encumbered therewith, which promotes the efficiency.

A fifth embodiment of the method according to the invention has the characteristic that, in the event of a further movement of the user from a first further work area associated with a first further exchange which comprises a first further memory to a second further work area associated with a second further exchange which comprises second further memory, a further coupling is effected between the first further memory and the second further memory, a further largest portion of the user data stored in the first further memory being copied and stored via the further coupling in the second further memory, and the user data stored in the first further memory means being definitive (available for copying) for the user and changes to be made in the user data taking place both in the first further memory and in the second further memory, the copied portion of the user data stored in the second further memory then being inspected for correctness with respect to the user data stored in the first further memory, whereafter, in the event of correctness, the portion of the user data stored in the second further memory becomes definitive (available for copying) for the user and changes to be made in the data take place only in the second further memory, the copied portion of the user data stored in the further memory becoming negligible (unavailable for copying).

This embodiment illustrates that, if the user has already moved from the base work area to the first further work area and the largest portion of the user data have been copied and stored in the first further memory, and if the user then moves to the second further work area, the largest portion of the user data is in that case copied from the first further memory into the second further memory, which will generally take place over a smaller distance than if copying had to take place from the base memory.

A sixth embodiment of the method according to the invention has the characteristic that, in the event of incorrectness of the copied portion of the user data stored in the second further memory with respect to the user data stored in the first further memory, the further largest portion of the user data stored in the first further memory is copied once again and is stored via the further coupling in the second further memory.

This increases the reliability of the method still further.

A seventh embodiment of the method according to the invention has the characteristic that the information belonging to the user data stored in the base memory and relating to a location of the other exchange is replaced by information relating to a location of the second further exchange.

As a result of storing the location of the second further exchange in the uncopied portion of the user data in the base memory, where the user is located is again permanently known in the base exchange, which again promotes the reliability.

It is pointed out that the movement of a user from the first further work area (such as, for example, the base area) to the second further work area (such as, for example, the other work area) is to be understood either as the movement of the user with his own terminal (such as in the case of mobile radial) or the movement of the user to another terminal (such as in the case of the follow-me feature). The movement of the user results in a movement of the largest portion of his user data to a new location but does not automatically imply that he also actually starts to communicate from his new location.

DETAILED DESCRIPTION

Figure 1:
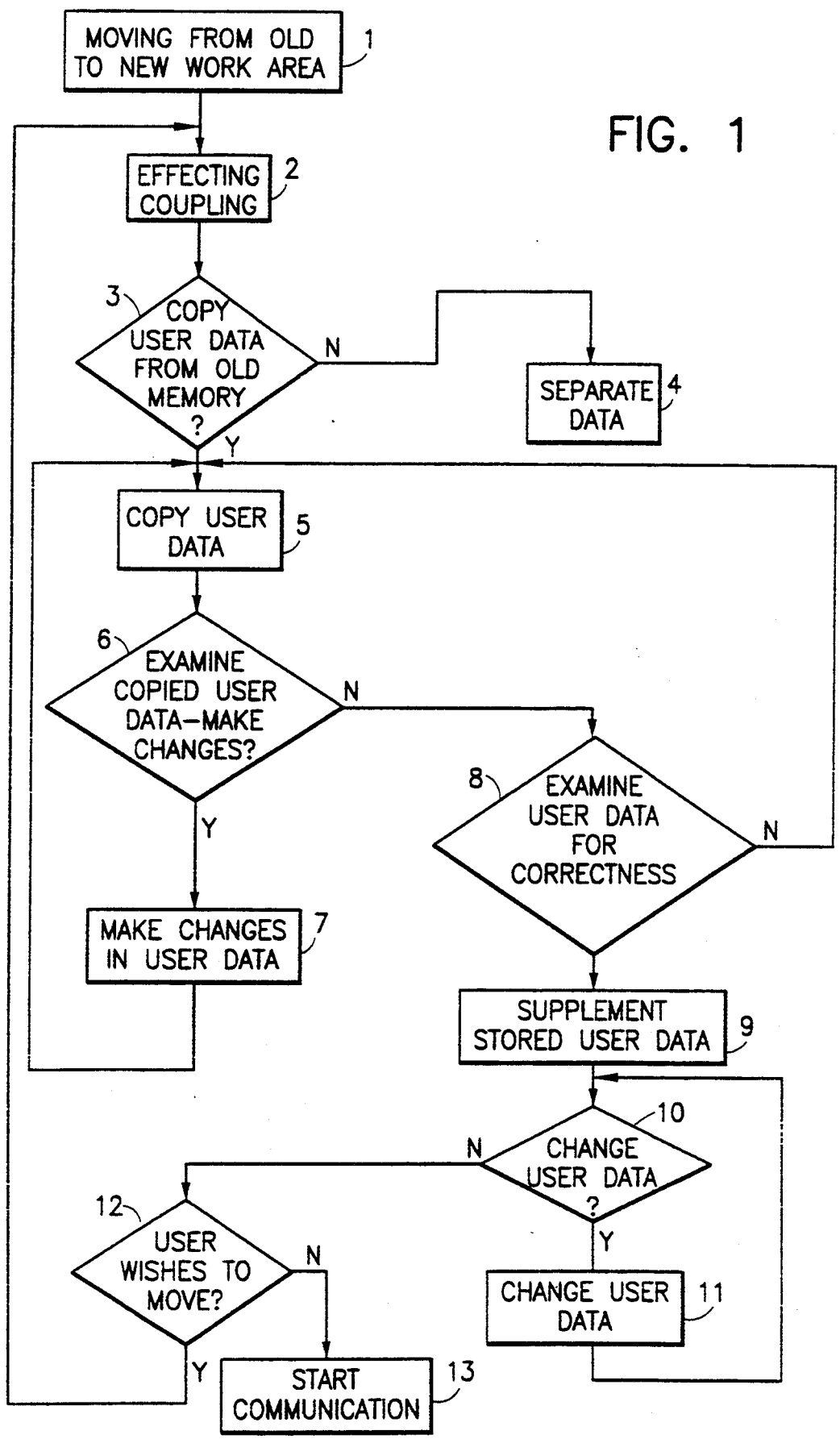
FIG. 1 shows a flow chart of the method according to the invention.

In the flow chart shown in FIG. 1, the blocks have the following meaning:

| block | meaning |
| --- | --- |
| 1 | user indicates that he is moving from an old work area to a new work area |
| 2 | coupling is effected between old memory means and new memory means |
| 3 | user data in the old memory means are examined for the necessity to be copied: no, to block 4 yes, to block 5 |
| 4 | the portion of the user data present in the old memory means and not to be copied is or has been separated from the portion to be copied and is not copied; this refers, for example, to data relating to an old exchange belonging to the old work area or, if the old work area is a base work area and an old exchange is a base exchange, data relating to a location of the new exchange or relating to a protection of the user |
| 5 | the portion to be copied of the user data present in the old memory means is copied and transmitted to the new memory means |
| 6 | the copied portion of the user data is examined for changes to be made: yes, to block 7 no, to block 8 |
| 7 | the changes to be made are made in the copied portion of the user data present in the old memory means; back to block 5 (this has the consequence that the portion to be copied of the user data present in the old memory means is copied once |

| block | meaning |
|---|---|
| | again and is transmitted to the new memory means; of course, it is also possible to make the changes in both memory means, as a result of which renewed copying and transmitting becomes superfluous) |
| 8 | the user data stored in the new memory means are examined for correctness: no, back to block 5 yes, to block 9 |
| 9 | the user data stored in the new memory means become definitive for the user and are supplemented by information relating to the new exchange, the copied portion of the user data present in the old memory means becomes negligible and information belonging to user data present in the base memory means and relating to a location of the old exchange is replaced by information relating to a location of the new exchange |
| 10 | the user data stored in the new memory means are examined for changes to be made: yes, to block 11 no, to block 12 |
| 11 | the changes to be made are made in the user data present in the new memory means; back to block 10 |
| 12 | whether the user wishes to move again is examined: yes, back to block 2 no, to block 13 |
| 13 | communication can be started |

The method according to the flowchart shown in FIG. 1 proceeds as follows. As soon as a user indicates that he is moving from an old work area (such as his base work area or a first further work area) to a new work area (such as another work area or a second further work area) (block 1 ), a coupling is effected between old memory means (such as base memory means or first further memory ) and new memory means (such as other memory means or second further memory means) (block 2). This indication takes place in the case of mobile radio as a result of the user and his terminal being located between two base stations and the succeeding base station measuring a stronger radio signal than the preceding base station and it takes place in the case of normal telephony as a result of the user switching on a follow-me feature or informing a succeeding telephone set of his presence, for example, by means of a chip card. User data in the old memory means are then examined for the need to be copied (block 3). If the old memory means are the base memory means, the information relating to the location of the new exchange and relating to the protection of the user, for example, will not need to be copied and if the old memory means are the first further memory means, the information relating to the first further exchange associated therewith, for example, will not need to be copied. In this way, the portion of the user data not to be copied in the old memory means is or has been separated from the portion which has indeed to be copied (block 4) and this lastmentioned portion is copied and transmitted via the coupling to the new memory means (block 5).

At this instant, all the user data are still located in the old memory means and the largest portion of said user data, which has been copied, is located in the new memory means. This portion is examined for any changes to be made (block 6). If these exist, they are either made in the user data present in the old memory means, whereafter these modified data are copied and transmitted again (block 5) or they are made both in the old and the new memory means, as a result of which the recopying and retransmission become superfluous (block 7). The user data stored in the new memory means are then examined for correctness (block 8). This can be done by comparing them with the data present in the old memory means or by means of error-detecting and/or error-correcting codes. If correctness is not confirmed, the copied portion of the data stored in the old memory means is recopied and retransmitted (block 5) and if correctness is in fact confirmed, said user data stored in the new memory means become definitive for the user and are supplemented with information relating to said new exchange (block 9). Furthermore, the copied portion of the user data present in the old memory means becomes negligible (unavailable for copying), which implies that they can be overwritten and that the memory capacity used therefor can be reused and the information belonging to the user data present in the base memory means and relating to a location of the old exchange is replaced by information relating to a location of the new exchange.

The user data stored in the new memory means are then examined for changes to be made (block 10). If there are changes to be made, these are only made in the user data stored in the new memory means (block 11 ) and, furthermore, whether the user wishes to move once again is examined again (block 12). If this is so, a further coupling is made from the new memory means to the yet newer memory means (block 2), etc., and if this is not so, a communication can be started (block 13).

I claim:

1. A method of managing, in a telecommunication network, user data of a user who may move from a base work area associated with a base exchange which comprises a base memory to another work area associated with another exchange which comprises another memory, independent of whether or not the user is communicating, comprising:

effecting a coupling between the base memory and said another memory when the user moves from the base work area to said another work area;

copying a largest portion of the user data stored in the base memory and storing the copied data in said another memory via the coupling, the user data stored in the base memory remaining available for further copying, and changes to be made in the user data taking place both in the base memory and in said another memory;

inspecting the copied portion of the user data stored in said another memory for correctness with respect to the user data stored in the base memory; and in the event of correctness of the copied portion of the user data, making the portion of the user data stored in said another memory available for further copying and wherein changes to be made in the data take place only in said another memory, the copied portion of the user data stored in the base memory thereafter becoming unavailable for further copying.

2. The method of claim 1, wherein, in the event of incorrectness of the copied portion of the user data stored in said another memory with respect to the user data stored in the base memory, the largest portion of the user data stored in the base memory is copied once again and is stored via the coupling in said another memory.

3. The method of claim 2, wherein user data not belonging to the largest portion and stored in the base memory comprises information relating to a location of said another exchange.

4. The method of claim 3, wherein the user data not belonging to the largest portion and stored in the base memory comprises information relating to a protection of the user.

5. The method of claim 3, wherein user data not belonging to the copied portion and stored in said another memory comprises information relating to said another exchange.

6. The method of claim 3, wherein:
in the event of a further movement of the user from a first further work area associated with a first further exchange which comprises a first further memory to a second further work area associated with a second further exchange which comprise a second further memory, further comprising:
effecting a further coupling means between the first further memory and the second further memory;
copying a further largest portion of the user data stored in the first further memory and storing said copied further largest portion of the user data via the further coupling in the second further memory, the user data stored in the first further memory being available for further copying and changes to be made in the user data taking place both in the first further memory and in the second further memory;
inspecting the copied portion of the user data stored in the second further memory for correctness with respect to the user data stored in the first further memory; and
in the event of correctness of the inspected user data stored in the second further memory, the portion of the user data stored in the second further memory becoming available for further copying and wherein changes to be made in the data take place only in the second further memory, the copied portion of the user data stored in the first further memory becoming available for further copying.

7. The method according to claim 6, wherein, in the event of incorrectness of the copied portion of the user data stored in the second further memory with respect to the user data stored in the first further memory, the further largest portion of the user data stored in the first further memory is copied once again and stored via the further coupling in the second further memory.

8. The method according to claim 7, wherein the information belonging to the user data stored in the base memory and relating to a location of said another exchange is replaced by the information relating to a location of the second further exchange.

9. The method according to claim 6, wherein the information belonging to the user data stored in the base memory and relating to a location of said another exchange is replaced by the information relating to a location of the second further exchange.

10. The method of claim 2, wherein the user data not belonging to the largest portion and stored in the base memory comprises information relating to a protection of the user.

11. The method of claim 2, wherein user data not belonging to the copied portion and stored in said another memory comprises information relating to said another exchange.

12. The method of claim 1, wherein user data not belonging to the largest portion and stored in the base memory comprises information relating to a location of said another exchange.

13. The method of claim 12, wherein the user data not belonging to the largest portion and stored in the base memory comprises information relating to a protection of the user.

14. The method of claim 12, wherein user data not belonging to the copied portion and stored in said another memory comprises information relating to said another exchange.

15. The method of claim 1, wherein the user data not belonging to the largest portion and stored in the base memory comprises information relating to a protection of the user.

16. The method of claim 1, wherein user data not belonging to the copied portion and stored in said another memory comprises information relating to said another exchange.

* * * * *

UNITED STATES PATENT AND TRADEMARK OFFICE
CERTIFICATE OF CORRECTION

PATENT NO. : 5,423,068
DATED : June 6, 1995
INVENTOR(S) : Hecker

It is certified that error appears in the above-indentified patent and that said Letters Patent is hereby corrected as shown below:

Column 2, line 14, delete "means";
lines 31 and 32, delete "(unavailable for copying)".

Col. 4, line 36, after "of" insert --an embodiment of--.

Column 7, line 20 (claim 6), delete "means".

Signed and Sealed this

Fourteenth Day of January, 1997

Attest:

BRUCE LEHMAN

*Attesting Officer*    *Commissioner of Patents and Trademarks*